United States Patent [19]

Narutaki

[11] Patent Number: 4,733,069
[45] Date of Patent: Mar. 22, 1988

[54] POSITION ENCODER USING A LASER SCAN BEAM

[75] Inventor: Yoshinori Narutaki, Machida, Japan
[73] Assignee: Optec Co., Ltd., Tokyo, Japan
[21] Appl. No.: 829,776
[22] Filed: Feb. 14, 1986
[51] Int. Cl.$^4$ .......................... G01D 5/36; G11B 7/00
[52] U.S. Cl. ............................. 250/231 SE; 340/347 P
[58] Field of Search ............ 250/231 SE, 237 G, 566, 250/570; 340/347 P, 870.29; 74/435, 436

[56] References Cited

U.S. PATENT DOCUMENTS 4,110,610  8/1978  Mueller et al. .................. 340/347 P
4,602,242  7/1986  Kimura .......................... 250/231 SE

FOREIGN PATENT DOCUMENTS 0224515  12/1984  Japan ............................. 250/231 SE
0033012   2/1985  Japan ............................. 250/231 SE
0056217   4/1985  Japan ............................. 250/231 SE Primary Examiner—Edward P. Westin
Assistant Examiner—Charles F. Wieland
Attorney, Agent, or Firm—Jones, Day, Reavis & Pogue

[57] ABSTRACT

Known absolute type position encoders have poor resolution due to bits density of tracks formed on an encoding member and mechanical size of sensors opposed to the encoding member for reading absolute position data from the tracks. This invention provides a position encoder comprising a laser scanning type encoding member on which data tracks aligned at equal intervals in a moving direction of a part to be position-measured. A sensor with a single laser beam deflectable along the track is used for reading the position data. High resolution is obtained since it depends upon recorded pitch of tracks. Many data can be recorded on each track, including error correction code for the position code. It improves reliability of the encoder.

9 Claims, 10 Drawing Figures

POSITION ENCODER USING A LASER SCAN BEAM

BACKGROUND OF THE INVENTION

1. Field of the Invention

The present invention relates to a position encoder and, more particularly, to an encoder for obtaining position data of a rotating member or linearly moving member.

2. Description of the Prior Art

Conventionally, an encoder using a movable encoding plate and a fixed sensor is adopted in order to obtain rotational angle data of a rotating shaft or position data of a linearly moving table. One conventional absolute rotary encoder uses an encoding plate having a plurality of concentric tracks on which codes corresponding to position data are colored or coated in light and dark portions. The encoding plate comprises a reflection type or transmission type disk, and a fixed photosensor is provided opposite to the disk. Another known rotary encoder adopts a magnetic sensor and a magnetic disk having a plurality of concentric tracks which are magnetized into north and south poles to correspond to bits of position data.

The conventional encoders have limited precision depending on data density to be recorded on the encoding plate (i.e., the number of bits included in a unit length of a track) and resolution of the sensor or the S/N ratio of a read signal. Since the size of the encoding plate is limited, the resolution is also limited. For example, in a rotary encoder using a light-transmission type encoding disk and a photosensor, an incandescent lamp or a light-emitting diode is used as a light source. A spot size of the read light beam cannot be decreased. In addition, resolution is limited by the size of the light receiving element and extraneous light interference. Similarly, the rotary encoder of the second type using a magnetic disk and a magnetic sensor has limited resolution due to recording wavelength and resolution of a magnetic sensor such as a variable reluctance element.

SUMMARY OF THE INVENTION

The present invention has been made in consideration of the above situation, and has as its object to provide a position encoder with extremely high resolution.

According to the present invention, a position encoder comprises a laser scanning type encoding member and position data tracks aligned at equal intervals in a moving direction of the member. With this arrangement, position data with extremely high resolution can be obtained.

DETAILED DESCRIPTION OF THE PREFERRED EMBODIMENTS

Figure 1:
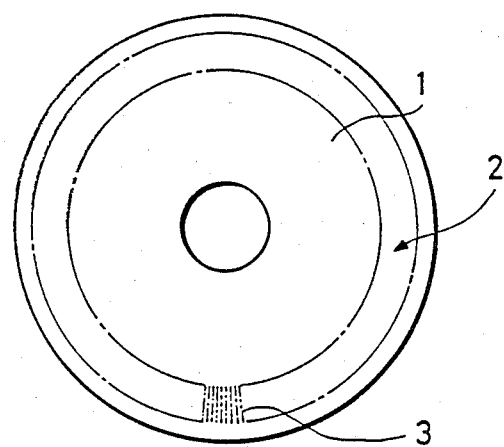
FIG. 1 is a plan view of an encoding member of an absolute rotary encoder to which the present invention is applied.
Figure 2:
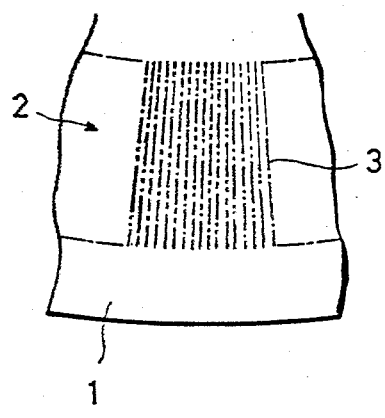
FIG. 2 is an enlarged plan view of tracks on the encoding member.
Figure 3:
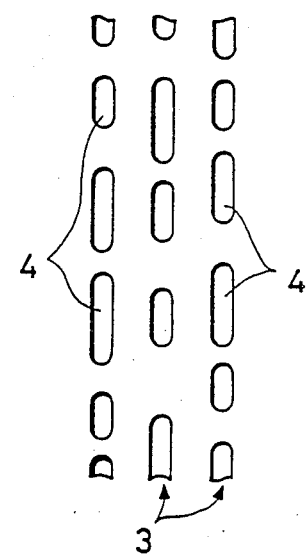
FIG. 3 is an enlarged plan view of data recording pits on the tracks.

An encoding member 1 in FIG. 1 comprises a disk-shaped optical recording member. Absolute data on a rotational angle of the encoding member 1 (i.e., address data from a given 0° position) are written entirely in a recording region 2 of the peripheral portion of the member 1 in the form of digital codes. As shown in FIG. 2, the recording region 2 is constituted by a plurality of tracks 3, aligned at equal intervals along the radial direction of the encoding member 1. As shown in FIG. 3, data pits 4 corresponding to the angle data are formed in each track 3.

A pitch between two tracks 3 is 1.5 to 3 $\mu$m. When the encoding member 1 has a diameter of 10 cm, angle data can be recorded at a resolution of 1 minute or less per track (several hundred thousands of tracks in 360°). Assuming that a track pitch is set to be 1.5 $\mu$m and the encoding member 1 has an effective diameter of 6.2 cm, an angular resolution of 10 seconds can be obtained.

Each track 3 consists of over 10 bits, including error detection and correction codes, and has a track length of 10 to 20 $\mu$m. Angle data can be recorded using various modulation methods, e.g., PE (phase encoding), FM (frequency modulation), MFM (modified FM), and EFM (8/14 modulation) methods.

Figure 4:
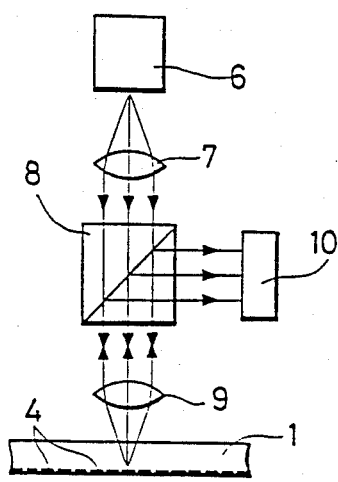
FIG. 4 is a schematic diagram of an optical scanning system.

The data pits 4 formed in each track 3 can be scanned with the scanning optical system shown in FIG. 4. A radiation beam emitted from a laser 6 is focused on the surface of the member 1 via a collimator lens 7, a beam splitter 8, and an objective lens 9. The beam reflected therefrom branches from the beam splitter 8 to a photosensor 10, thus deriving the angle data as an electrical signal. Each pit 4 has a depth of $\frac{1}{4}$ wavelength, and can be formed by irradiating a photoresistive film or a thin metal film with a laser beam. Once an original encoding member is prepared, it can be duplicated a large number of times by press molding.

Figure 5:
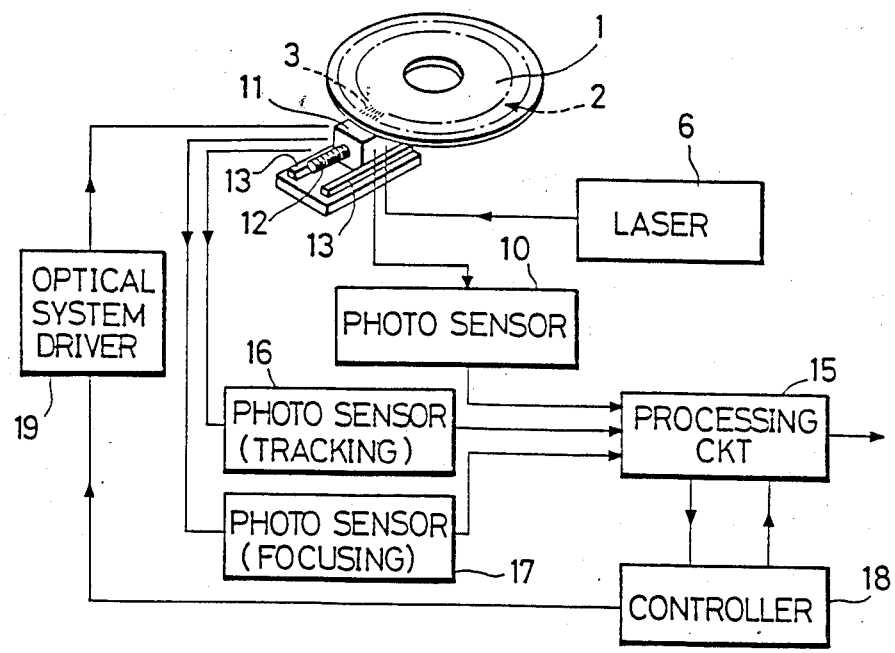
FIG. 5 is a schematic block diagram of a rotary encoder of the present invention.

FIG. 5 is a schematic block diagram of a rotary encoder according to the present invention. As shown in FIG. 1, since the tracks 3 are formed along the radial direction of the encoding member 1, a pickup 11 including the scanning optical system (FIG. 4) is movable along the radial direction of the encoding member 1. A feeding unit of the pickup 11 can be constituted by, e.g., a screw shaft 12 and a guide section 13. Alternatively, an electromagnetic coil of a moving coil type, a linear motor of moving magnet type, an electromechanical transducer such as a piezoelectric element, a rotation-linear movement conversion mechanism using an eccentric cam, an electrostatic electromechanical transducer, and the like, can be adopted. The pickup 11 can be fixed in position, and only a laser beam can be scanned in the radial direction of the encoding member 1. In this case, in the optical system in FIG. 4, the optical axis of the objective lens 9 can be deviated by an electromagnetic coil, or a laser beam can be deflected by a Galvano mirror, as needed.

The optical system of the pickup 11 can include a tracking servo unit for performing positional control of a beam in the widthwise direction of track so as to introduce a beam spot onto the track, if needed. In this case, an electromechanical transducing system for deflecting a laser beam in the widthwise direction of track will be added. It requires biaxial beam control in the radial and circumferential disk directions. In addition to this, when focusing control of the objective lens 9 is to be performed, triaxial control is necessary.

In the rotary encoder, a scanning beam must be fixed in a rotating direction of the encoding member 1. When tracking servo control is performed by deflecting the scanning beam in the widthwise direction of track, it causes an error in read out data with respect to a correct angular position. The error can be corrected based on the tracking servo error.

Referring to FIG. 5, a radiation beam from the laser 6 is guided to the optical system of pickup 11 through an optical fiber. A beam reflected from the pits 4 is converted into an electrical signal by the photosensor 10, is demodulated and decoded by a processing circuit 15, and is then derived as rotational angle detection data. Tracking and focusing signals are respectively detected by tracking and focusing photosensors 16 and 17, and tracking and focusing errors are calculated by the processing circuit 15. These errors are sent to a controller 18. An optical system driver 19 is driven based on the control output from the controller 18, and performs tracking and focusing servo control operations.

Figure 6:
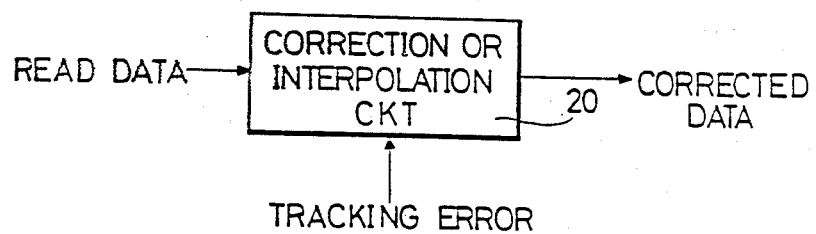
FIG. 6 is a block diagram of a data correction circuit.

When tracking servo control is performed, the scanning beam is shifted in the rotating direction of the rotating member from a fixed position. This shift amount (a ±½ track pitch at maximum) can be regarded as an inherent error in the system. For example, if the encoder has an angular resolution of 10 seconds, rotational angle detection data can be displayed on the order of detection value ±5 seconds. As shown in FIG. 6, detection data can be corrected based on the tracking error using a correction circuit 20. For example, if the tracking error corresponds to a 2/10 track pitch, corrected data approximate to a true value can be obtained simply by adding or subtracting 2 seconds to or from the detection data. Since the correction circuit 20 also acts as an interpolation circuit, data with resolution on the order of, e.g., 1/10 track pitch can be easily obtained.

Figure 7:
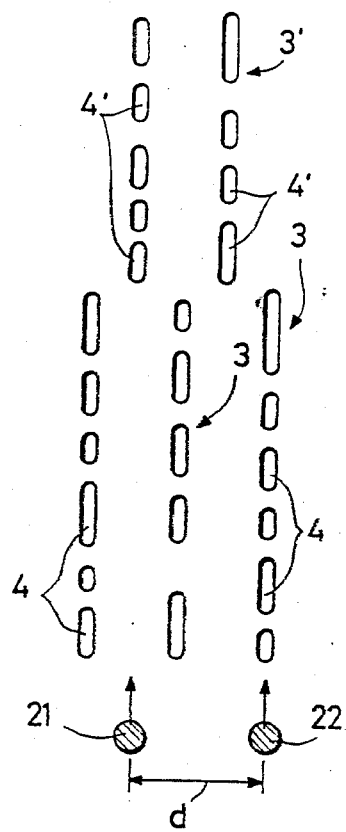
FIG. 7 is a plan view showing a modification of a track arrangement and a scanning beam as well as the data recording pits of FIG. 3.

Data can be correctly read out using pit arrays, shown in FIG. 7, without using a tracking servo unit. In FIG. 7, other tracks 3' are formed adjacent to the tracks 3, which are shifted by ½ track pitch. Even if the scanning beam scans an intermediate portion between two adjacent tracks 3, data can be correctly read out by scanning the tracks 3' of an intermediate pitch. Therefore, for a given track pitch, a higher resolution can be obtained.

Alternatively, data can be read out correctly using two parallel scanning beams 21 and 22, having a distance d therebetween, corresponding to an odd multiple of a ½ track pitch. When the beam 21 misses data, the data can be correctly read out by the beam 22, whose position is shifted therefrom at ½ pitch. In this case, resolution is also improved. Assuming that the beam 21 is used as a reference beam, when the data is read out by the beam 22, the readout data must be corrected by the distance d.

A photomagnetic recording method using the Faraday effect or the Kerr effect can be adopted as the recording method of the encoding member 1. Sine or cosine data can be written in each track 3 in addition to the rotational angle data. If a rotational angular range of a rotating member is limited, the encoding member 1 can be fixed and the pickup 11 can be rotated.

Figure 8:
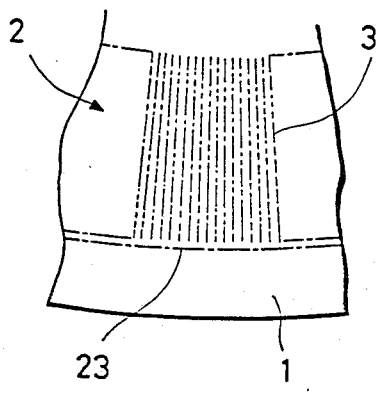
FIG. 8 is a plan view showing a modification of data tracks.

In the above embodiment, the angle data is scanned while the encoding member 1 is fixed in position. Alternatively, if a track 23 is provided along the rotating direction of the encoding member 1, as shown in FIG. 8, the angle data written in the track 23 can be scanned while rotating the encoding member 1 at a constant speed. In this case, pits are formed in the track 23 in the circumferential direction of the member 1. Coarse angle data is written in each segment of the track 23 corresponding to several tens of radial track 3. Therefore, the coarse angle data on the tracks 23 is first scanned while rotating the encoding member 1 at a constant speed. After the encoding member 1 has approached a target angle, it is slowed down and the direction of the scanning beam is switched to a radial direction. Thus, the encoding member 1 can be positioned where the target angle data is read at any one of tracks 3.

Figure 9:
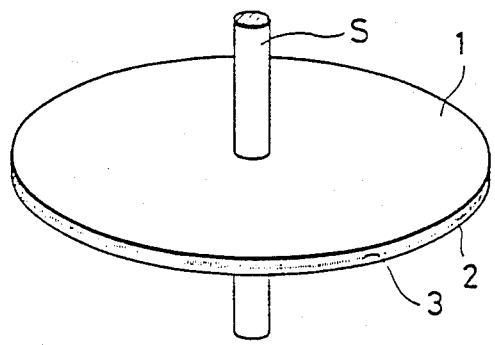
FIG. 9 is a perspective view showing a modification of an encoding member.

FIG. 9 shows a modification of an encoding member used in a rotary encoder. In this modification, tracks 3, parallel to a rotating shaft S, are formed in a recording region 2 on the peripheral end face of a cylindrical encoding member 1, which is fitted around the rotating shaft S. Codes indicating absolute data of rotational angles are written in the tracks 3 in the form of pits. A fixed optical scanning system is arranged opposite to the peripheral end face of the encoding member 1 so as to be able to scan a laser beam in the direction of the tracks 3.

Figure 10:
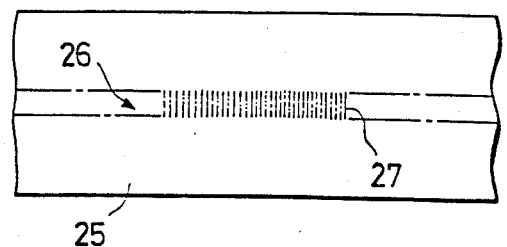
FIG. 10 is a partial plan view of an encoding member when position data of a linearly moving member is to be detected.

FIG. 10 shows another modification of an encoding member. This encoding member is used to obtain positional or moving distance data on a linearly moving member. The encoding member comprises a rectangular optical recording member extending along a moving direction of a moving member to be subjected to position measurement. Absolute data indicating a moving position of an encoding plate 25 with respect to a fixed part (reference position) is written in a recording region 26. The recording region 26 consists of a large number of tracks 27 extending in a direction perpendicular to the moving direction of the encoding member 25 and separated from each other at equal intervals. Data pits 4 corresponding to position data codes are formed in each track 27. A fixed optical scanning system is arranged opposite to the surface of the encoding member 25, and comprises a pickup for scanning a laser beam in the direction of the tracks 27.

According to the present invention, data tracks are aligned at equal intervals in a moving direction of a laser scanning-type encoding member, and position data is written in the data tracks. A scanning laser beam is scanned in the longitudinal direction of the tracks, so as to obtain the position data of a moving member.

Therefore, since the tracks do not extend along the moving direction of the encoding member, resolution is not limited by data recording density in the longitudinal direction of the tracks but is determined by a pitch between two tracks. When a laser beam is used, the track pitch can be shortened, thus obtaining a position encoder with high resolution. Furthermore, when a laser beam is used as a scanning sensor, the resolution is not limited by the mechanical size of the sensor.

Since tracks corresponding to respective digits of data need not be scanned by a number of parallel sensors but a single track is scanned with only a single scanning beam to read out position data, even if a large amount of position data is written in each track, hardware is not increased in size. Furthermore, the data can contain error detection and correction bits, providing an encoder of high revolution detection with high reliability.

What is claimed is:

1. Apparatus for measuring the positional orientation of an object along a predetermined first path including an encoded member adapted for rigid connection to the object for movement therewith and a substantially stationary reading device adjacent the encoded member, movement of the object along the first path defining a second path on the encoded member corresponding to the relative movement of the reading device adjacent thereto; a plurality of position codes spaced along the second path of the encoded device, each code comprising position information uniquely defining a point along the second path, the position information for each code being contained along a first track oriented substantially transversely to the second path, the reading device including means for scanning the track adjacent the reading device whereby the positional orientation of the object along the predetermined first path may be measured.

2. The orientation measuring apparatus of claim 1 wherein the encoded member is disc-shaped, the second path on the encoded member is circumferential and each of the tracks lies along spaced radial lines of the encoded member whereby the angular orientation of the object may be determined.

3. The orientation measuring apparatus of claim 1 wherein the second path defines a straight line along the encoded member whereby the orientation of the object along a linear path may be determined.

4. The orientation measuring apparatus of claim 1 wherein the encoded member is cylindrical and the second path lies along the cylindrical surface thereof each of the tracks lies along spaced axial lines lying on the cylindrical surface whereby the angular orientation of the object can be determined.

5. The orientation measuring apparatus of claim 1 including additional position codes, said codes defining additional spaced tracks oriented transversely to the second path, the additional tracks being arranged along a third path defined on the encoded member adjacent and generally parallel to the second path, the additional tracks are further arranged such that the additional tracks are positioned generally midway between the first tracks.

6. The orientation measuring apparatus of claim 5 wherein the reading device includes first and second scanning means for simultaneously scanning a first track and an additional track.

7. Apparatus for measuring the positional orientation of an object along a predetermined first path including an encoded member adapted for rigid connection to the object for movement therewith and a substantially stationary reading device adjacent the encoded member, movement of the object along the first path defining a second path on the encoded member corresponding to the relative movement of the reading device adjacent thereto; a plurality of position codes spaced along the second path of the encoded device, each code comprising position information uniquely defining a point along the second path, the position information for each code being contained along a track oriented substantially transversely to the second path, the reading device including means for scanning the track adjacent the reading device and means for automatically adjusting the scanning means transverse to the tracks whereby the scanning means may be aligned with the track to be scanned thereby facilitating an accurate determination of the positional orientation of the object along the predetermined first path.

8. The orientation measuring apparatus of claim 7 wherein the means for automatically adjusting the scanning means transverse to the tracks includes means for detecting a transverse misalignment of the scanning means with respect to the track being scanned and means for generating an error signal representative of the detected misalignment and means responsive to the error signal for moving the scanning means transversely to the tracks whereby scanning means may be accurately aligned with the track to be scanned.

9. The orientation measuring apparatus of claim 8 further comprising circuit means for correcting the detected position data based on the error signal generated.

* * * * *